(12) United States Patent
Kim et al.

(10) Patent No.: US 8,276,724 B2
(45) Date of Patent: Oct. 2, 2012

(54) POWER TRANSMISSION SYSTEM FOR VEHICLE CHANGING POWER TRANSMISSION STATE BY ELECTRIC CONTROL

(75) Inventors: Yongkee Kim, Seoul (KR); Heecheon Jeong, Seosan-si (KR); Manbok Lee, Suwon-si (KR)

(73) Assignee: Dymos Inc., Seosan (KR)

( * ) Notice: Subject to any disclaimer, the term of this patent is extended or adjusted under 35 U.S.C. 154(b) by 640 days.

(21) Appl. No.: 12/547,671

(22) Filed: Aug. 26, 2009

(65) Prior Publication Data

US 2011/0048884 A1 Mar. 3, 2011

(51) Int. Cl.
*F16D 13/04* (2006.01)
*F16D 23/00* (2006.01)
*F16D 43/00* (2006.01)

(52) U.S. Cl. ..................... 192/35; 192/84.93

(58) Field of Classification Search .................... 192/35, 192/70.12, 84.93, 113.34
See application file for complete search history.

(56) References Cited

U.S. PATENT DOCUMENTS

| | | | |
|---|---|---|---|
| 6,905,008 B2 * | 6/2005 | Kowalsky et al. | 192/35 |
| 2002/0023816 A1 * | 2/2002 | Organek et al. | 192/35 |
| 2005/0023099 A1 * | 2/2005 | Sakurai et al. | 192/35 |
| 2008/0067024 A1 * | 3/2008 | Suzuki et al. | 192/35 |

\* cited by examiner

*Primary Examiner* — David D Le
*Assistant Examiner* — Huan Le
(74) *Attorney, Agent, or Firm* — Bryan Cave LLP

(57) ABSTRACT

The present invention provides a technology of improving mechanism that drives a pilot clutch for operating a main clutch, in a power transmission system for a vehicle changing power transmission state by electric control in which an input shaft and an output shaft coaxially disposed in a main housing is configured such that power is connected/disconnected by the main clutch.

25 Claims, 5 Drawing Sheets

US 8,276,724 B2

POWER TRANSMISSION SYSTEM FOR VEHICLE CHANGING POWER TRANSMISSION STATE BY ELECTRIC CONTROL

BACKGROUND OF THE INVENTION

1. Field of the Invention

The present invention relates to a power transmission system for a vehicle changing a power transmission state by electric control to transmit and stop driving force by operating an electromagnet, particularly a technology relating to a power transmission system for a vehicle changing a power transmission state by electric control which can be applied to a coupling, a transfer case, a limited slip differential, and a torque vectoring axle of vehicles.

2. Description of the Related Art

Power transmission system for a vehicle changing a power transmission state by electric control, which is equipped with an electromagnet in the related art, as shown in FIG. 1, mainly use a mechanism in which an armature 73 that is attracted by the magnetic force of a circular electromagnet 79 fixed to a main housing 33 operates a pilot clutch 71 by applying electric current to the electromagnet 79, frictional torque generated by the pilot clutch 71 creates relative rotational velocity between a cam 63 constituting a ball ramp and an apply plate 61 to generate axial magnified-force between the cam 63 and the apply plate 61, the apply plate 61 presses a main clutch 41, and rotational force of an input shaft 1261 is transmitted to an output shaft 51 through the main clutch 41.

The armature 73 should be positioned opposite to the electromagnet 79 across the pilot clutch 71 to operate the pilot clutch 71 using the magnetic force of the electromagnet 79. Further, the pilot clutch 71 should be made of steel through which lines of magnetic force can easily pass, and should have a long slot for paths of the lines of magnetic force and a coil housing 39 between the pilot clutch 71 and the electromagnet 79 should have a structure made of different materials, which are welded, such as stainless steel that is a non-magnetic material in order to create a closed loop of the lines of magnetic force for smoothly supplying the magnetic force of the electromagnet 79 to the armature 73.

For reference, FIG. 2 shows a graph comparing forces (attracting force) exerted in the armature according to the amount of electric current applied to the electromagnet, when a different material, which is a non-magnetic material, such as stainless steel, is welded to the coil housing and when the coil housing is manufactured only by steel of one material without welding a different material, in which it can be seen that significantly large force is exerted in the armature for the same electric current, when the coil housing where a different material, such as stainless steel, is welded is used.

Meanwhile, it is difficult to make the main clutch 41 and the pilot clutch 71 of the same material, because the main clutch 41 should be made of a material other than steel to transmit large driving force.

Further, since the coil housing 39 has a structure made of different materials, which are welded, such as stainless steel 89, as described above, the manufacturing is difficult and the cost correspondingly increases.

On the other hand, since a gap from a magnetic coil of the electromagnet 79 to the armature 73 is a very important and sensitive factor that determines the operational force of the armature 73 by the lines of magnetic force and should be precisely maintained, a difficult process of adjusting an error of machining in manufacturing, using a shim, is needed.

SUMMARY OF THE INVENTION

Therefore, in order to overcome the above problems, an object of the invention is to provide a power transmission system for a vehicle changing power transmission state by electric control that makes it possible to interchange a main clutch and the pilot clutch by allowing free selection of the material of the pilot clutch, regardless of creating a closed loop of lines of magnetic force of the magnetic coil, overcome the problems of difficulties in manufacturing a coil housing and increase of cost in the related art, and maintain the gap between the magnetic coil and the armature without using a shim.

In order to achieve the objects of the present invention, a power transmission system for a vehicle changing power transmission state by electric control in which an input shaft and an output shaft coaxially disposed in a main housing is configured such that power is connected/disconnected by a main clutch, includes: a ball ramp that has an apply plate which axially moves freely to apply axial pressing force to the main clutch and is restricted in rotation with respect to one of the input shaft and the output shaft and a cam which is disposed adjacent to the apply plate with balls therebetween; a pilot clutch that is made of a non-magnetic material and disposed to restrict rotation of a cam of the ball ramp with respect to the other one of the input shaft and the output shaft which is not restricted in rotation with the apply plate, by axial pressing force; a magnetic coil that has a ring shape perpendicular to the axial direction and is fixed in a core member that has a cross section, which covers the surface facing the pilot clutch and is open to the opposite side, and is fixed in the main housing; an armature that is disposed to be axially movable toward the pilot clutch when being attracted by the magnetic force of the magnetic coil; and an apply cylinder that is disposed to be axially movable to transmit axial movement force of the armature to the pilot clutch, in which the core member and the armature have surfaces facing each other, which have partial slopes.

The power transmission system for a vehicle changing power transmission state by electric control may further include an output clutch housing that is disposed coaxially with the input shaft and has the main clutch, the ball ramp, and the pilot clutch between the input shaft and the output clutch housing, and where the output shaft is connected, in which the armature and the apply cylinder may be fitted around the input shaft, and the apply plate of the ball ramp may be engaged with the input shaft by a spline.

The input shaft may be provided with thrust rings that are fixed to both sides by snap rings, with the ball ramp and the main clutch therebetween.

The one of the thrust rings, which is adjacent to the cam of the ball ramp, may support the cam of the ball ramp through the thrust bearing.

The main housing may be provided with a thrust cover, which closes the inside of the main housing, from the output clutch housing disposed at the opposite side to the inserting direction of the input shaft, and the output clutch housing may have an output boss passing through the thrust cover and having a spline inside.

A thrust bearing may be disposed between the output clutch housing and the thrust cover to support axial force of the output clutch housing.

A mounting flange may be integrally formed with the main housing at the portion adjacent to the thrust cover to connect a housing of another device that receives the power outputted through the output boss of the output clutch housing.

Plug holes may be formed perpendicular to the input shaft through the main housing to be converted in order to allow oil to be injected and discharged.

The input shaft may have a hollow space inside, and the input shaft may have radial oil holes that are communicated with the hollow space where the ball ramp and the main clutch are positioned.

The input shaft may further have axial oil holes that axially pass through the position where the main clutch is disposed.

The output clutch housing may be open to the magnetic coil and have a plurality of lubricant holes through the side.

The power transmission system for a vehicle changing power transmission state by electric control of the present invention may further include: an intermediate shaft that is coaxially disposed with the input shaft and where the output shaft is connected; and an input clutch housing that is disposed coaxially with the intermediate shaft and has the main clutch, the ball ramp, and the pilot clutch between the intermediate shaft and the input clutch housing, and where the input shaft is connected, in which the armature and the apply cylinder may be fitted around the intermediate shaft.

The intermediate shaft may have one end inserted through the end of the input shaft and supported therein and the other end engaged with the output shaft by a spline, while being free to rotate, and may be radially connected with the main clutch through a hub.

The power transmission system for a vehicle changing power transmission state by electric control may further include a core member that has a cross section, which covers the surface facing the pilot clutch of the magnetic coil and is open to the opposite side and is fixed in the main housing, in which the armature may be positioned opposite to the pilot clutch, across the magnetic coil, and the apply cylinder may have a cylinder portion that is combined with the armature through the inner space of the core member and a flange that radially expands from the cylinder portion to transmit pressing force to the pilot clutch.

The core member may have a cross section covering the inner side and the outer side of the magnetic coil, and the armature and the core member each may have a composite surface corresponding to each other at the sides facing each other.

The composite surfaces formed on the armature and the core member each have a perpendicular surface that is perpendicular to the axial direction and a circumferential slope having a cross section inclined at a predetermined angle to the perpendicular surface.

The circumferential slopes of the armature and the core member may be symmetrically formed at the radial inner sides and outer sides of the armature and the core member.

The circumferential slopes of the armature and the core member may be formed such that the armature covers the core member, while the inner circumference and outer circumference of the armature protrude toward the core member in the cross section.

The ends of the inner circumference and the outer circumference of the armature having the cross section protruding toward the core member may have obtuse shapes.

The inner circumference of the core member, which is in contact with the cylinder portion of the apply cylinder, may be further provided with a guide means to prevent friction therebetween and enable smooth relative motion.

The cylinder portion and the flange of the apply cylinder may be formed to cover the magnetic coil and the core member.

The apply cylinder may be made of an insulating material that prevents leakage of the electromagnetic force.

A thrust bearing may be disposed between the flange of the apply cylinder and the pilot clutch.

A slot may be formed in the main housing to fit the core member to be restricted in rotation.

A connector for the magnetic coil may be doubly sealed at the contact portion with the main housing and at the contact portion passing through the core member by oil seals.

Friction plates and reaction plates that constitute the pilot clutch and the main clutch may be made of the same material.

The friction plates and reaction plates that constitute the pilot clutch and the main clutch may be formed to have the same dimension to be interchangeable.

According to the present invention, it is possible to interchange a main clutch and the pilot clutch by allowing free selection of the material of the pilot clutch, regardless of creating a closed loop of lines of magnetic force of the magnetic coil, overcome the problems of difficulties in manufacturing a coil housing and increase of cost in the related art, maintain the gap between the magnetic coil and the armature without using a shim, and precisely control the armature by adjusting the electric current level of the magnetic coil.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE PREFERRED EMBODIMENTS

Preferred embodiments of the present invention are described hereafter with reference to the accompanying drawings.

Figure 1:
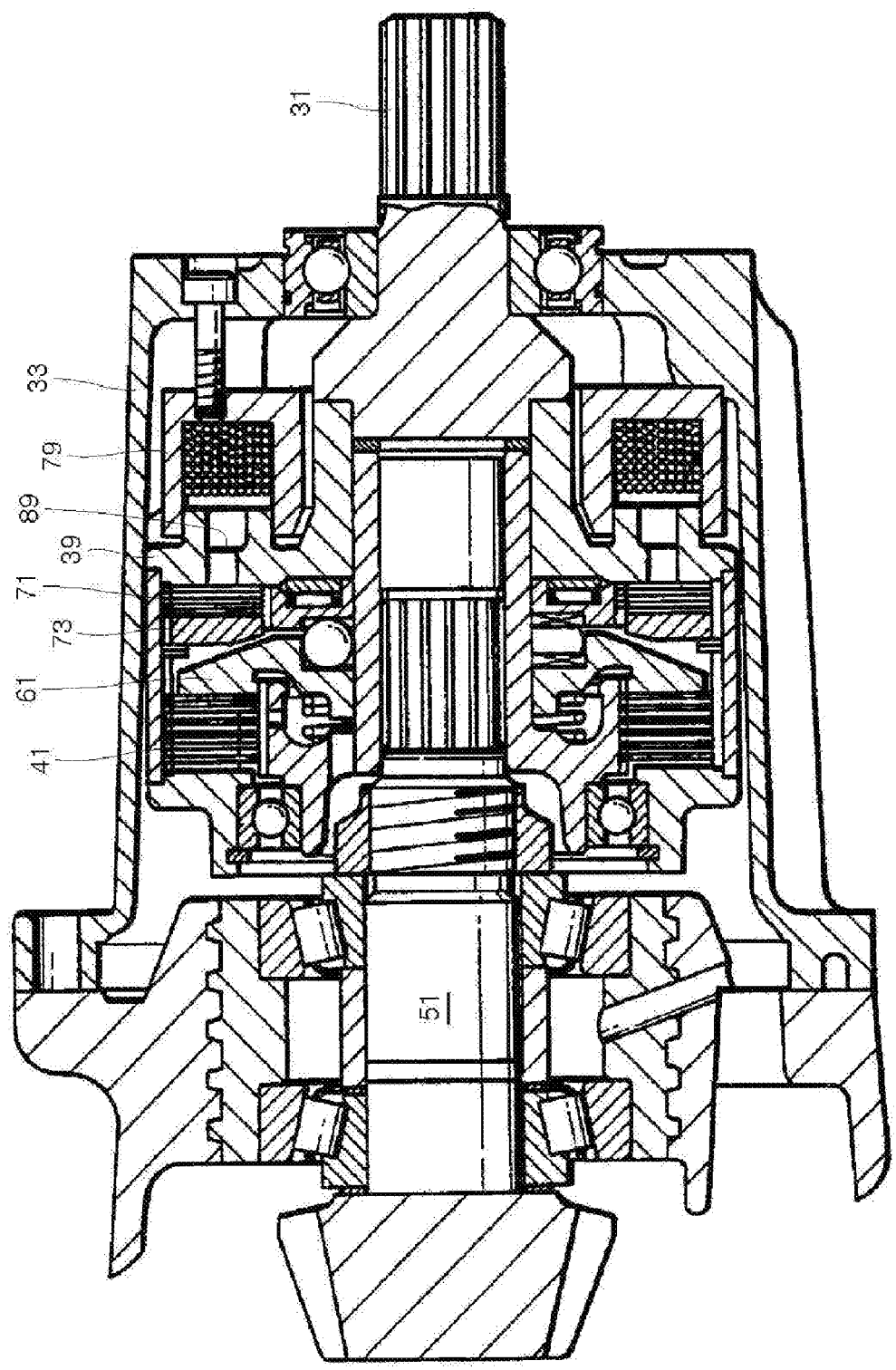
FIG. 1 is a cross-sectional view of a power transmission system for a vehicle changing power transmission state by electric control according to the related art.
Figure 2:
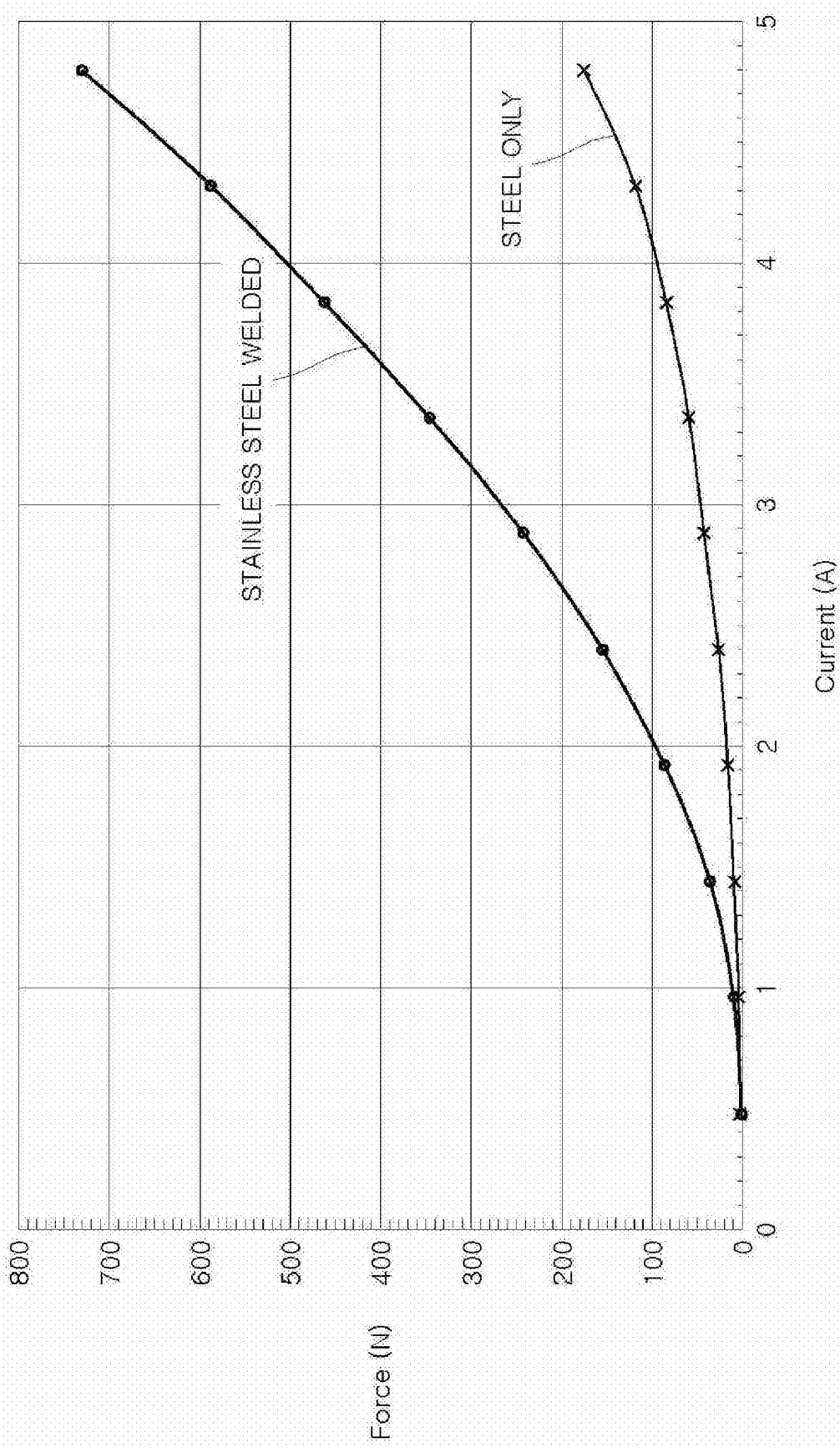
FIG. 2 is a view showing a graph comparing changes of attracting force exerted in an armature with respect to electric current supplied to an electromagnet, according to the structure of a coil housing.
Figure 3:
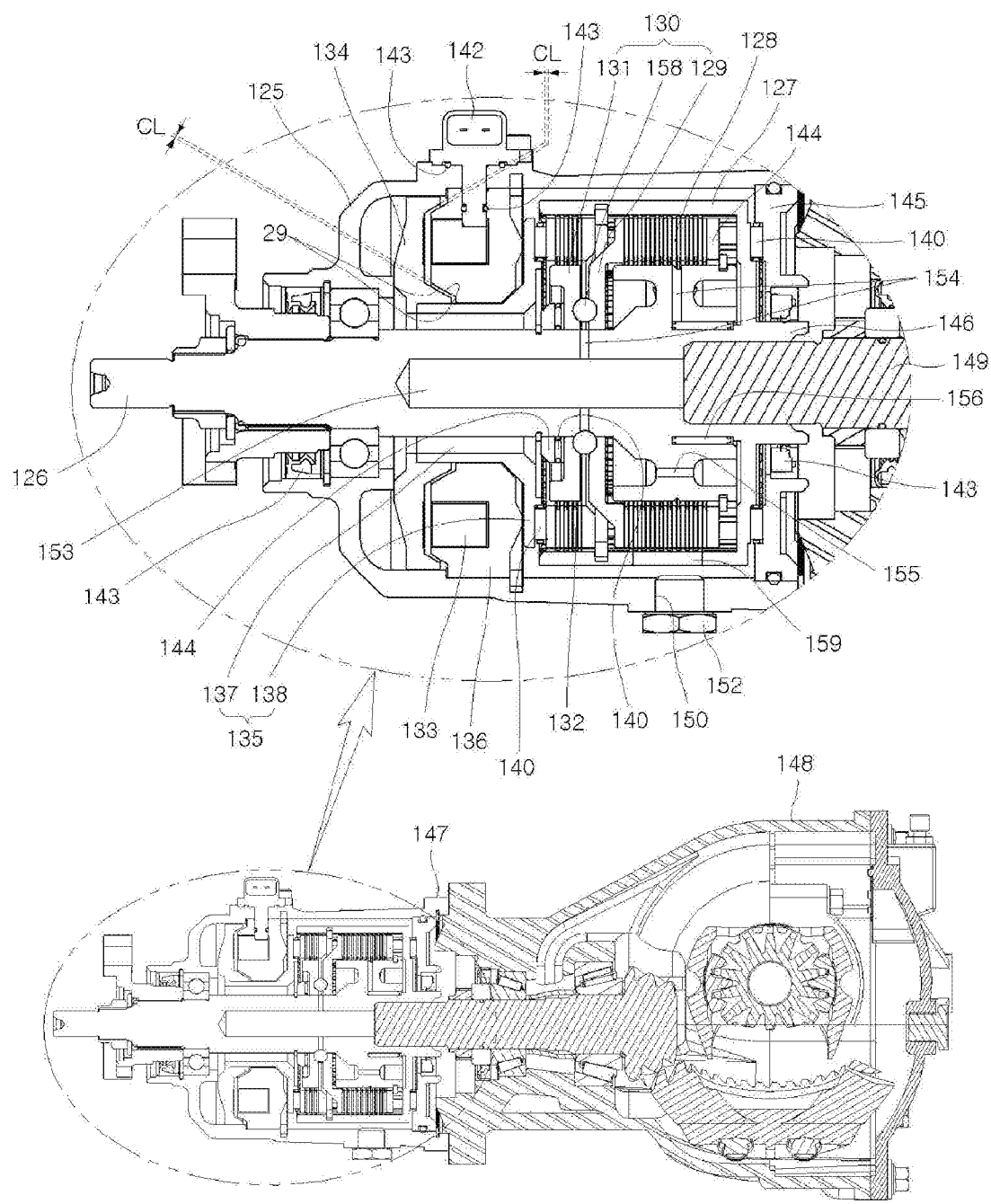
FIG. 3 is a cross-sectional view of a power transmission system for a vehicle changing power transmission state by electric control according to the present invention.

Referring to FIG. 3, a power transmission system for a vehicle changing power transmission state by electric control according to an embodiment of the present invention includes: a main housing 125; an input shaft 126 that is rotatably disposed in the main housing 125; an output shaft 149 that is disposed coaxially with the input shaft 126; a main clutch 128 that is disposed between the input shaft 126 and the output shaft 149 to connect/disconnect power by axial pressing force; a ball ramp 130 that has an apply plate 129 which axially moves freely to apply axial pressing force to the main clutch 128 and is restricted in rotation with respect to one of the input shaft 126 and the output shaft 149 and a cam 131 which is disposed adjacent to the apply plate 129 with balls 158 therebetween; a pilot clutch 132 that is disposed to restrict rotation of a cam 131 of the ball ramp 130 with respect to the other one of the input shaft 126 and the output shaft 149 which is not restricted in rotation with the apply plate 129, by axial pressing force; a magnetic coil 133 that is a ring shape perpendicular to the axial direction and is fixed in the main housing 125; an armature 134 that is disposed to be axially movable toward the pilot clutch 132 when being attracted by the magnetic force of the magnetic coil 133; and an apply cylinder 135 that is disposed to be axially movable to transmit axial movement force of the armature 134 to the pilot clutch 132.

Further, the power transmission system for a vehicle changing power transmission state by electric control further includes an output clutch housing 127 that is disposed coaxially with the input shaft 126 and has the main clutch 128, ball ramp 130, and pilot clutch 132 between the input shaft 126 and the output clutch housing 127, and where the output shaft 149 is connected, in which the armature 134 and the apply cylinder 135 are fitted around the input shaft 126.

That is, the power transmission system has a mechanism that transmits the axial movement force of the armature 134 to the pilot clutch 132 through the apply cylinder 135 by attracting the armature 134 using magnetic force generated by the magnetic coil 133.

Therefore, unlike the related art, the pilot clutch 132 can have a non-magnetic material, which is unrelated to creating a closed loop of lines of magnetic force from the magnetic coil 133 to the armature 134, and a non-magnetic structure.

Friction plates and reaction plates that constitute the pilot clutch 132 and the main clutch 128 were made of the same material having the same dimensions to be interchangeable, in this embodiment using the above characteristics.

The friction plates and the reaction plates herein are ring-shaped parts that are alternatively disposed and of which the inner circumferences and the outer circumferences are engaged by splines to transmit and stop power using frictional force between them.

For reference, the axial direction herein implies the longitudinal direction of the input shaft 126.

A core member 136 that has a cross section, which covers the inner side, outer side, and the surface facing the pilot clutch 132 of the magnetic coil 133 and is open to the opposite side, is fixed around the magnetic coil 133 in the main housing 125.

That is, the magnetic coil 133 is fixed in the main housing 125 by the core member 136.

The core member 136, unlike coil housings in the related art, is also unrelated to creating the closed loop of lines of magnetic force between the magnetic coil 133 and the armature 134, such that difficult work and structure, such as welding different non-magnetic materials, such as stainless steel, are not necessary, thereby reducing the manufacturing cost.

The armature 134 is positioned opposite to the pilot clutch 132, across the magnetic coil 133, and the apply cylinder 135 is composed of a cylinder portion 137 that is combined with the armature 134 through the space between the core member 136 and the input shaft 126 and a flange 138 that radially expands from the cylinder portion 137 to transmit pressing force to the pilot clutch 132.

Further, the cylinder portion 137 and the flange 138 of the apply cylinder 135 may be integrally formed, or may be combined after being manufactured as separate parts.

The armature 134 and the core member 136 each have a composite surface corresponding to each other at sides facing each other.

The composite surface implies, not just a single plane, but a plane formed by combining two or more different surfaces, and in this embodiment, is composed of a perpendicular surface that is perpendicular to the axial direction and a circumferential slope 139 having a cross section inclined at a predetermined angle to the perpendicular surface.

The circumferential slopes 139 of the armature 134 and the core member 136 are symmetrically formed at the radial inner sides and outer sides of the armature 134 and the core member 136.

In this embodiment, the circumferential slopes 139 are formed such that the armature 134 covers the core member 136 while the inner circumference and outer circumference of the armature 134 protrude toward the core member 136 in the cross section, in which the ends of the inner circumference and the outer circumference of the armature 134 are obtuse to prevent saturation of a magnetic field.

The circumferential slopes 139 of the armature 134 and the core member 136 are the portions where the lines of magnetic force of the magnetic coil 133 mainly pass to create the closed loop of the lines of magnetic force, and this portions define a gap (S) that determines operational properties of the armature 134 with respect to the magnetic force of the magnetic coil 133.

The gap (S) makes it possible to more precisely control movement of the armature 134 by the magnetic force of the magnetic coil 133, by changing less than the movement distance of the armature 134 due to the magnetic force of the magnetic coil 133.

That is, assuming that the angle of the circumferential slopes 139 of the armature 134 and the core member 136 to the axial direction is a, the gap (S) that is the shortest distance between the two circumferential slopes of the armature 134 and the core member 136 is the result of multiplying the axial movement distance of the armature 134 by $\sin(a)$; therefore, the gap (s) changes less than the axial movement of the armature 134, such that it is possible to relatively improve preciseness of control, as compared with when the gap is defined by, not the circumferential slopes 139, but the planes perpendicular to the axial direction.

Figure 5:
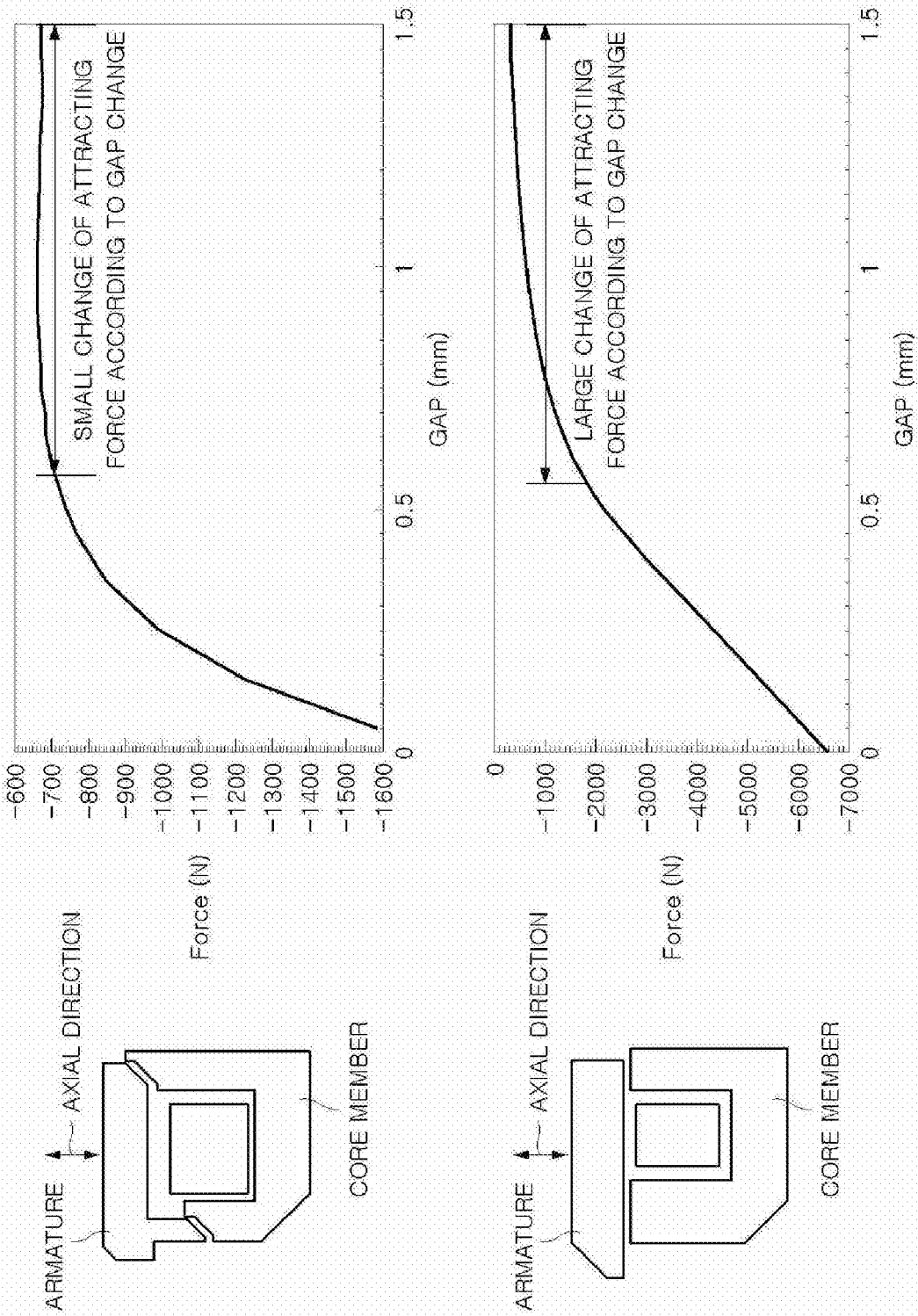
FIG. 5 is a view showing a graph comparing a difference of the change shape of attracting force exerted in an armature with respect to a change of the size of a gap, according to the gap structure between the armature and a core member.

For reference, FIG. 5 shows a graph comparing data obtained by testing a change of attracting force exerted in the armature according to a change of the size of the gap, when the gap between the armature and the core member is defined at an angle (the present invention) and in a plane perpendicular (typical type) to the axial direction that is the movement direction of the armature as in the present invention, in which it can be seen that the change of the attracting force according to the change of the gap is small when the gap is formed at an angle to the axial direction as in the present invention, as compared with when the gap is formed in a plane perpendicular to the axial direction. This proves that it is relatively easier and more advantageous to control movement of the armature when the gap is formed at an angle to the axial direction as compared with when the gap is formed in a plane perpendicular to the axial direction.

Further, in the structure in which the gap (s) is defined by the circumferential slopes 139 without an obstacle between the magnetic coil 133 and the armature 134 as described above, it does not need to adjust the gap using a shim as in the related art and the movement of the armature 134 can be controlled by only controlling electric current that is applied to the magnetic coil 133.

It is preferable to further provide a guide means to the inner circumference of the core member 136, which is in contact with the cylinder portion 137 of the apply cylinder 135, to prevent friction between them and enable smooth relative motion.

The guide means may be achieved by plating the inner circumference of the core member 136, or may be a bush or a bearing fitted around the inner circumference.

The cylinder portion 137 and the flange 138 of the apply cylinder 135 are formed to cover the magnetic coil 133 and the core member 136 and preferably made of an insulating material that prevents leakage of the electromagnetic force, in which stainless steel may be used for the insulating material.

A thrust bearing 140 is disposed between the flange 138 of the apply cylinder 135 and the pilot clutch 132, the apply plate 129 of the ball ramp 130 is engaged with the input shaft 126 by a spline to be restricted in rotation, and the pilot clutch 132 is disposed to restrict rotation of the cam 131 of the ball ramp 130 with respect to the output shaft 149 by the output clutch housing 127.

A slot 33 is formed in the main housing 125 to fit the core member 136 to be restricted in rotation.

Therefore, the core member 136 is restricted in rotation by inserting it in the slot 33 of the main housing 125 and can be axially fixed by a snap ring or a bolt.

Further, the core member 136 and the main housing 125 may be combined by screws.

A connector 142 for the magnetic coil 133 is doubly sealed at the contact portion with the main housing 125 and at the contact portion passing through the core member 136 by oil seals 143.

Therefore, the sealing is completed at a time by disposing the connector 142 through the main housing 125 and the core member 136, after disposing the magnetic coil 133 and the core member 136 in the main housing 125.

Thrust rings 144 are fixed to both sides on the input shaft 126 by snap rings, with the ball ramp 130 and the main clutch 128 therebetween.

Therefore, it is possible to firmly support large axial force exerted by the ball ramp 130 and the main clutch 128, thereby ensuring sufficient durability.

Further, the one of the thrust rings 144, which is adjacent to the cam 131 of the ball ramp 130, supports the cam 131 of the ball ramp 130 through the thrust bearing 140, without interfering with rotation of the cam 131.

The main housing 125 is provided with a thrust cover 145, which closes the inside of the main housing 125, from the output clutch housing 127 disposed at the opposite side to the inserting direction of the input shaft 126, and the output clutch housing 127 has an output boss 146 passing through the thrust cover 145 and having a spline inside.

Further, the output shaft 149 is engaged with the spline of the output boss 146 to output power and the figure shows an example when a pinion shaft 149 of a rear axle is connected as a type of the output shaft, in which both of the output shaft and the pinion shaft are indicated by reference numeral '149'.

A thrust bearing 140 is disposed between the output clutch housing 127 and the thrust cover 145 to support axial force of the output clutch housing 127.

Accordingly, the output clutch housing 127 is firmly supported axially while being rotatable at both sides, by the thrust bearing 140 disposed between the flange 138 of the apply cylinder 135 and the pilot clutch 132 and the thrust bearing 140 disposed between the thrust cover 145 and the output clutch housing 127.

A mounting flange 147 is integrally formed with the main housing 125 at the portion adjacent to the thrust cover 145 to connect a housing of another device that receives the power outputted through the output boss 146 of the output clutch housing 127.

Further, an axle housing 148 of the rear axle is connected to the mounting flange 147 in FIG. 3.

Oil seals 143 are disposed between the main housing 125 and the input shaft 126, and the thrust cover 145 of the main housing 125 and the output boss 146 of the output clutch housing 127, in order to keep the inside of the main housing 125 airtight such that all the parts inside can be lubricated and cooled by injected oil, thereby further improving the durability without needing to lubricate the parts with grease.

Plug holes 150 are formed perpendicular to the input shaft 126 through the main housing 125 to be converted in order to allow oil to be injected and discharged, such that it is possible to perform necessary work, such as supplementing or changing oil, when a problem is generated in the oil inside the main housing 125.

In this embodiment, two plug holes 150 are formed at 90° from the input shaft 126 such that the upper one can be used for injection and the other lower one can be used for discharge, and for reference, FIG. 3 shows only the plug hole 150 at the lower portion and a drain plug 152 fastened thereto.

Alternatively, it is possible to form only one plug hole 150 and use it for both injecting and discharging the oil.

The input shaft 126 has a hollow space 153 inside and radial oil holes 155 that are communicated with the hollow space 153 where the ball ramp 130 and the main clutch 128 are positioned, and further has axial oil holes 61 that axially pass through the position where the main clutch 128 is disposed.

Accordingly, it is possible to sufficiently ensure lubricant performance for the ball ramp 130 and the main clutch 128 and more smoothly lubricate a radial bearing 63 disposed at the end of the input shaft 126.

The output clutch housing 127 is open to the magnetic coil 133 and has a plurality of lubricant holes 157 formed through the side for smooth lubrication.

The operation of connecting/disconnecting power of the power transmission system for a vehicle changing power transmission state by electric control having the above configuration is as follows.

When electric current is not applied to the magnetic coil 133, rotational force applied to the input shaft 126 is transmitted to the apply plate 129 of the ball ramp 130 and the cam 131 connected with the pilot clutch 132 is rotated with the input shaft 126 by rotational force transmitted from the apply plate 129 through the balls 158, because the pilot clutch 132 is disengaged.

Further, in this operation, the main clutch 128 is also disengaged, such that input shaft 126 freely and relatively rotates without transmitting power to the output clutch housing 127.

That is, the power of the input shaft 126 is not connected to the output shaft 149.

In the above position, when electric current is applied to the magnetic coil 133, the armature 134 is attracted by the magnetic force generated by the magnetic coil 133.

The armature 134 axially moving applies pressing force to the pilot clutch 132 through the apply cylinder 135.

The pilot clutch 132 receiving the pressing force transmits power between the output clutch housing 127 and the cam 131 of the ball ramp 130.

Accordingly, as the cam 131 that has had the same rotational velocity as the input shaft 126 is engaged with the output clutch housing 127, relative rotation is generated between the cam 131 of the ball ramp 130 and the apply plate 129, such that amplified axial force is applied to the apply plate 129.

The force of the apply plate 129 presses the main clutch 128, such that the rotational force of the input shaft 126 is directly transmitted to the output clutch housing 127.

As a result, the rotational force of the input shaft 126 is transmitted to the output shaft 149 through the output clutch housing 127.

Figure 4:
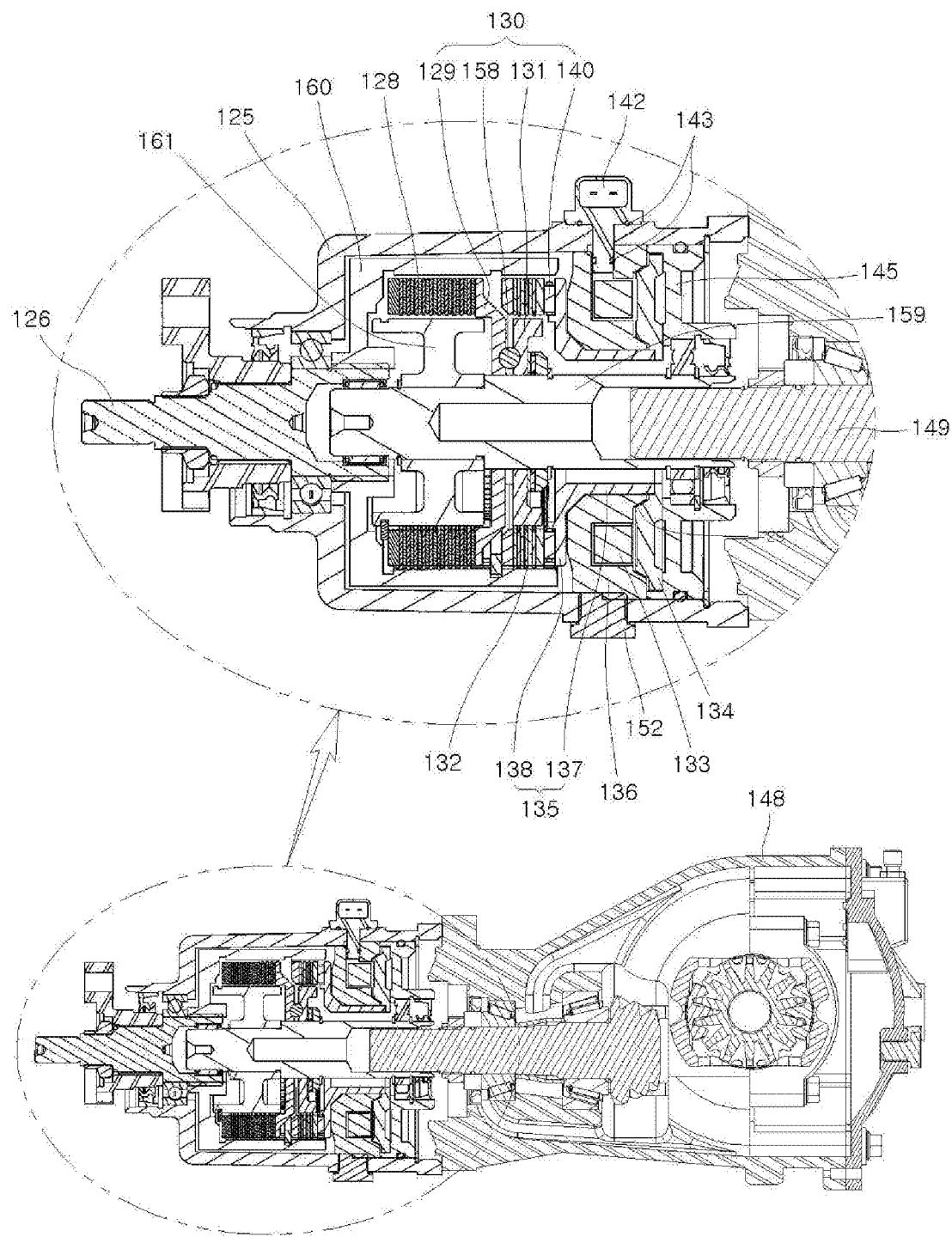
FIG. 4 is a view showing another embodiment of the present invention.

FIG. 4 shows another embodiment of a power transmission system for a vehicle changing power transmission state by electric control according to the present invention, which, as in the above embodiment, basically includes: a main housing 125; an input shaft 126 that is rotatably disposed in the main housing 125; an output shaft 149 that is disposed coaxially with the input shaft 126; a main clutch 128 that is disposed between the input shaft 126 and the output shaft 149 to connect/disconnect power by axial pressing force; a ball ramp 130 that has an apply plate 129 which is free in axial moving to apply axial pressing force to the main clutch 128 and is restricted in rotation with respect to one of the input shaft 126 and the output shaft 149 and a cam 131 which is disposed adjacent to the apply plate 129 with balls 158 therebetween; a pilot clutch 132 that is disposed to restrict rotation of a cam 131 of the ball ramp 130 with respect to the other one of the input shaft 126 and the output shaft 149 which is not restricted in rotation with the apply plate 129, by axial pressing force; a magnetic coil 133 that has a ring shape perpendicular to the axial direction and is fixed in the main housing 125; an armature 134 that is disposed to be axially movable toward the pilot clutch 132 when being attracted by the magnetic force of the magnetic coil 133; and an apply cylinder 135 that is disposed to be axially movable to transmit axial movement force of the armature 134 to the pilot clutch 132.

Further, the power transmission system for a vehicle changing power transmission state by electric control further includes: an intermediate shaft 159 that is coaxially disposed with the input shaft 126 and where the output shaft 149 is connected; and an input clutch housing 160 that is disposed coaxially with the intermediate shaft 159 and has the main clutch 128, ball ramp 130, and pilot clutch 132 between the intermediate shaft 159 and the input clutch housing 160, and where the input shaft 126 is connected, in which the armature 134 and the apply cylinder 135 are fitted around the intermediate shaft 159.

The intermediate shaft 159 has one end inserted through the end of the input shaft 126 and supported by a radial bearing and the other end engaged with the output shaft 149 by a spline, while being free in rotation, and is radially connected with the main clutch 128 through a hub 161.

The inner circumference of the hub 161 is welded to or engaged with the intermediate shaft 159 by a spline and the outer circumference is engaged with friction plates or reaction plates of the main clutch 128 by splines.

The apply plate 129 of the ball ramp 130 is engaged with the intermediate shaft 159 by a spline to be restricted in rotation with respect to the output shaft 149 and the pilot clutch 132 is disposed to restrict rotation of the cam 131 of the ball ramp 130 with respect to the input shaft 126 through the input clutch housing 160.

This embodiment has similar mechanism composed of the main clutch 128, ball ramp 130, pilot clutch 132, magnetic coil 133, armature 134, and apply cylinder 135, with the above embodiment, the input shaft 126 and the output shaft 149 are disposed in the opposite direction with respect to the mechanism, and the other configuration and operation are substantially the same as the above embodiment; therefore, description for the others is not provided.

What is claimed is:

1. A power transmission system for a vehicle changing power transmission state by electric control in which an input shaft and an output shaft coaxially disposed in a main housing is configured such that power is connected/disconnected by a main clutch, the power transmission system for a vehicle comprising:

a ball ramp that has an apply plate which axially moves freely to apply axial pressing force to the main clutch and is restricted in rotation with respect to one of the input shaft and the output shaft and a cam which is disposed adjacent to the apply plate with balls therebetween;

a pilot clutch that is made of a non-magnetic material and disposed to restrict rotation of a cam of the ball ramp with respect to the other one of the input shaft and the output shaft which is not restricted in rotation with the apply plate, by axial pressing force;

a magnetic coil that has a ring shape perpendicular to an axial direction and is fixed in a core member, the core member has a cross section which covers a surface of the magnetic coil facing the pilot clutch and the core member is open to an opposite side and is fixed in the main housing;

an armature that is disposed to be axially movable toward the pilot clutch when being attracted by a magnetic force of the magnetic coil; and an apply cylinder that is disposed to be axially movable to transmit axial movement force of the armature to the pilot clutch, wherein the core member and the armature have surfaces facing each other, which have partial slopes.

2. The power transmission system for a vehicle changing power transmission state by electric control according to claim 1, further comprising:

an intermediate shaft that is coaxially disposed with the input shaft and where the output shaft is connected; and an input clutch housing that is disposed coaxially with the intermediate shaft and has the main clutch, the ball ramp, and the pilot clutch between the intermediate shaft and the input clutch housing, and where the input shaft is connected, wherein the armature and the apply cylinder are fitted around the intermediate shaft.

3. The power transmission system for a vehicle changing power transmission state by electric control according to claim 2, wherein the intermediate shaft has one end inserted through a first end of the input shaft and supported therein and a second_end engaged with the output shaft by a spline, while being free to rotate, and is radially connected with the main clutch through a hub.

4. The power transmission system for a vehicle changing power transmission state by electric control according to claim 1, wherein friction plates and reaction plates that constitute the pilot clutch and the main clutch are made of the same material.

5. The power transmission system for a vehicle changing power transmission state by electric control according to claim 4, wherein the friction plates and reaction plates that constitute the pilot clutch and the main clutch are formed to have the same dimension to be interchangeable.

6. The power transmission system for a vehicle changing power transmission state by electric control according to claim 1, further comprising an output clutch housing that is disposed coaxially with the input shaft and has the main clutch, the ball ramp, and the pilot clutch between the input shaft and the output clutch housing, and where the output shaft is connected, wherein the armature and the apply cylinder are fitted around the input shaft, and the apply plate of the ball ramp is engaged with the input shaft by a spline.

7. The power transmission system for a vehicle changing power transmission state by electric control according to claim 6, wherein the output clutch housing is open to the magnetic coil and has a plurality of lubricant holes through a side.

8. The power transmission system for a vehicle changing power transmission state by electric control according to claim 6, wherein the input shaft is provided with thrust rings that are fixed to a first side and a second side by snap rings, with the ball ramp and the main clutch therebetween.

9. The power transmission system for a vehicle changing power transmission state by electric control according to claim 8, wherein the one of the thrust rings, which is adjacent to the cam of the ball ramp, supports the cam of the ball ramp through the thrust bearing.

10. The power transmission system for a vehicle changing power transmission state by electric control according to claim 6, wherein the input shaft has a hollow space inside, and the input shaft has radial oil holes that are communicated with the hollow space where the ball ramp and the main clutch are positioned.

11. The power transmission system for a vehicle changing power transmission state by electric control according to claim 10, wherein the input shaft further has axial oil holes that axially pass through a position where the main clutch is disposed.

12. The power transmission system for a vehicle changing power transmission state by electric control according to claim 6, wherein the main housing is provided with a thrust cover, which closes the inside of the main housing, from the output clutch housing disposed at the opposite side to an inserting direction of the input shaft, and the output clutch housing has an output boss passing through the thrust cover and having a spline inside.

13. The power transmission system for a vehicle changing power transmission state by electric control according to claim 12, wherein a thrust bearing is disposed between the output clutch housing and the thrust cover to support axial force of the output clutch housing.

14. The power transmission system for a vehicle changing power transmission state by electric control according to claim 12, wherein a mounting flange is integrally formed with the main housing at a portion adjacent to the thrust cover to connect a housing of another device that receives the power outputted through the output boss of the output clutch housing.

15. The power transmission system for a vehicle changing power transmission state by electric control according to claim 12, wherein plug holes are formed perpendicular to the input shaft through the main housing to be converted in order to allow oil to be injected and discharged.

16. The power transmission system for a vehicle changing power transmission state by electric control according to claim 6, wherein the armature is positioned opposite to the pilot clutch, across the magnetic coil, and the apply cylinder has a cylinder portion that is combined with the armature through an inner space of the core member and a flange that radially expands from the cylinder portion to transmit pressing force to the pilot clutch.

17. The power transmission system for a vehicle changing power transmission state by electric control according to claim 16, wherein an inner circumference of the core member, which is in contact with the cylinder portion of the apply cylinder, is further provided with a guide means to prevent friction therebetween and enable smooth relative motion.

18. The power transmission system for a vehicle changing power transmission state by electric control according to claim 16, wherein the cylinder portion and the flange of the apply cylinder are formed to cover the magnetic coil and the core member.

19. The power transmission system for a vehicle changing power transmission state by electric control according to claim 16, wherein the apply cylinder is made of an insulating material that prevents leakage of an electromagnetic force.

20. The power transmission system for a vehicle changing power transmission state by electric control according to claim 16, wherein a thrust bearing is disposed between the flange of the apply cylinder and the pilot clutch.

21. The power transmission system for a vehicle changing power transmission state by electric control according to claim 16, wherein a connector for the magnetic coil is doubly sealed at a contact portion with the main housing and at the contact portion passing through the core member by oil seals.

22. The power transmission system for a vehicle changing power transmission state by electric control according to claim 16, wherein the armature and the core member each have a composite surface corresponding to each other at the sides facing each other, and the composite surfaces formed on the armature and the core member each have a perpendicular surface that is perpendicular to the axial direction and a circumferential slope having a cross section inclined at a predetermined angle to the perpendicular surface.

23. The power transmission system for a vehicle changing power transmission state by electric control according to claim 22, wherein the circumferential slopes of the armature and the core member are symmetrically formed at radial inner sides and outer sides of the armature and the core member.

24. The power transmission system for a vehicle changing power transmission state by electric control according to claim 23, wherein the circumferential slopes of the armature and the core member are formed such that the armature covers the core member, while an inner circumference and an outer circumference of the armature protrude toward the core member in the cross section.

25. The power transmission system for a vehicle changing power transmission state by electric control according to claim 24, wherein the ends of the inner circumference and the outer circumference of the armature having the cross section protruding toward the core member have obtuse shapes.

* * * * *